US009365663B2

(12) United States Patent
Hagemeister et al.

(10) Patent No.: US 9,365,663 B2
(45) Date of Patent: Jun. 14, 2016

(54) PRODUCTION OF SHEAR-STABLE HIGH VISCOSITY PAO

(75) Inventors: Mark Paul Hagemeister, Houston, TX (US); Peijun Jiang, League City, TX (US); Margaret M. Wu, Skillman, NJ (US); Norman Yang, Westfield, NJ (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 1042 days.

(21) Appl. No.: 12/388,794

(22) Filed: Feb. 19, 2009

(65) Prior Publication Data

US 2009/0247442 A1    Oct. 1, 2009

Related U.S. Application Data

(60) Provisional application No. 61/040,855, filed on Mar. 31, 2008.

(51) Int. Cl.
| | | |
|---|---|---|
| *C08F 2/00* | (2006.01) | |
| *C10M 107/02* | (2006.01) | |
| *C08F 10/14* | (2006.01) | |
| *C08F 10/08* | (2006.01) | |
| *C08F 210/08* | (2006.01) | |

(52) U.S. Cl.
CPC ............... *C08F 10/14* (2013.01); *C08F 10/08* (2013.01); *C08F 210/08* (2013.01)

(58) Field of Classification Search
USPC ............. 585/500, 502, 520, 521, 522, 523
See application file for complete search history.

(56) References Cited

U.S. PATENT DOCUMENTS

| | | | |
|---|---|---|---|
| 2,978,442 A | 4/1961 | Brightbill et al. | |
| 3,149,178 A | 9/1964 | Hamilton et al. | |
| 3,164,578 A | 1/1965 | Baker et al. | |
| 3,382,291 A | 5/1968 | Brennan | |
| 3,742,082 A | 6/1973 | Brennan | |
| 3,769,363 A | 10/1973 | Brennan | |
| 3,780,128 A * | 12/1973 | Shubkin | 585/12 |
| 3,876,720 A | 4/1975 | Heilman et al. | |
| 3,883,417 A | 5/1975 | Woo et al. | |
| 4,016,349 A | 4/1977 | McKenna | |
| 4,132,663 A | 1/1979 | Heilman et al. | |
| 4,149,178 A | 4/1979 | Estes | |
| 4,172,855 A | 10/1979 | Shubkin et al. | |
| 4,180,575 A | 12/1979 | Rochling et al. | |
| 4,182,801 A * | 1/1980 | Miserlis et al. | 526/77 |
| 4,239,930 A | 12/1980 | Allphin et al. | |
| 4,263,465 A | 4/1981 | Sheng et al. | |
| 4,263,712 A | 4/1981 | Schroder | |
| 4,367,352 A | 1/1983 | Watts, Jr. et al. | |
| 4,413,156 A | 11/1983 | Watts, Jr. et al. | |
| 4,434,408 A | 2/1984 | Baba et al. | |
| 4,451,684 A | 5/1984 | Pasky | |
| 4,469,912 A | 9/1984 | Blewett et al. | |
| 4,587,368 A | 5/1986 | Pratt | |
| 4,665,208 A | 5/1987 | Welborn, Jr. et al. | |
| 4,701,489 A | 10/1987 | Hughes et al. | |
| 4,704,491 A | 11/1987 | Tsutsui et al. | |
| 4,827,064 A * | 5/1989 | Wu | 585/10 |
| 4,827,073 A | 5/1989 | Wu | |
| 4,874,734 A | 10/1989 | Kioka et al. | |
| 4,892,851 A | 1/1990 | Ewen et al. | |
| 4,908,463 A | 3/1990 | Bottelberghe | |
| 4,910,355 A | 3/1990 | Shubkin et al. | |
| 4,912,272 A | 3/1990 | Wu | |
| 4,914,254 A | 4/1990 | Pelrine | |
| 4,924,018 A | 5/1990 | Bottelberghe | |
| 4,926,004 A | 5/1990 | Pelrine et al. | |
| 4,950,822 A | 8/1990 | Dileo et al. | |
| 4,952,540 A | 8/1990 | Kioka et al. | |
| 4,956,122 A | 9/1990 | Watts et al. | |
| 4,962,262 A | 10/1990 | Winter et al. | |
| 4,967,032 A | 10/1990 | Ho et al. | |
| 4,968,827 A | 11/1990 | Davis | |
| 4,990,709 A | 2/1991 | Wu | |
| 4,990,771 A | 2/1991 | Minoura et al. | |
| 5,012,020 A | 4/1991 | Jackson et al. | |
| 5,017,299 A | 5/1991 | Gutierrez et al. | |
| 5,017,714 A | 5/1991 | Welborn, Jr. | |
| 5,041,584 A | 8/1991 | Crapo et al. | |
| 5,068,487 A | 11/1991 | Theriot | |
| 5,087,788 A | 2/1992 | Wu | |
| 5,091,352 A | 2/1992 | Kioka et al. | |
| 5,103,031 A | 4/1992 | Smith, Jr. | |
| 5,157,137 A | 10/1992 | Sangokoya | |
| 5,177,276 A | 1/1993 | Beach et al. | |

(Continued)

FOREIGN PATENT DOCUMENTS

| | | | | |
|---|---|---|---|---|
| CN | 101130467 | * | 2/2008 | ........................ 2/22 |
| EP | 0 277 004 | | 8/1988 | |

(Continued)

OTHER PUBLICATIONS

Machine Translation of CN 101130467.*
Bartels, et al., "Lubricants and Lubrication" in Ullmann's Encyclopedia of Industrial Chemistry, Wiley-VCH, 2003, available on-line Jan. 15, 2003.*
Nadkarni, Guide to ASTM Test Methods for the Analysis of Petroleum Products and Lubricants, 2nd ed., 2007, ASTM International—2007, month unkown.*
Whatman In-line Filter technical data available at http://web.archive.org on-line on Jan. 16, 2006.*
J. Brennan, "*Wide-Temperature Range Synthetic Hydrocarbon Fluids*", Ind. Eng. Chem. Prod. Res. Dev., 1980, vol. 19, pp. 2-6.
K. Denbigh, "*The Kinetics of Continuous Reaction Processes: Application to Polymerization*", J. Applied Chem, 1951, vol. 1, pp. 227-236.
K. Denbigh, "*Continuous Reactions: Part II. The Kinetics of Steady State Polymerisation*", Trans Faraday Soc., 1947, vol. 43, pp. 648-660.

(Continued)

*Primary Examiner* — In Suk Bullock
*Assistant Examiner* — Aaron Pierpont
(74) *Attorney, Agent, or Firm* — Luke A. Parsons; Nancy T. Krawczyk

(57) ABSTRACT

The invention is directed to a process for the preparation of high viscosity lubricant base stocks by contacting alphaolefin feedstocks with single-site metallocene catalysts in a mixed flow or continuous stirred tank reactors.

13 Claims, No Drawings

(56) References Cited

U.S. PATENT DOCUMENTS

| | | | |
|---|---|---|---|
| 5,186,851 A | 2/1993 | Gutierrez et al. | |
| 5,188,724 A | 2/1993 | Heilman et al. | |
| 5,204,419 A | 4/1993 | Tsutsui et al. | |
| 5,206,199 A | 4/1993 | Kioka et al. | |
| 5,220,100 A | 6/1993 | Massie et al. | |
| 5,235,081 A | 8/1993 | Sangokoya | |
| 5,248,801 A | 9/1993 | Sangokoya | |
| 5,264,642 A | 11/1993 | Wu | |
| 5,329,032 A | 7/1994 | Tran et al. | |
| 5,369,196 A | 11/1994 | Matsumoto et al. | |
| 5,382,739 A | 1/1995 | Atkins et al. | |
| 5,391,793 A | 2/1995 | Marks et al. | |
| 5,416,229 A | 5/1995 | Tran et al. | |
| 5,462,995 A | 10/1995 | Hosaka et al. | |
| 5,498,815 A | 3/1996 | Schaerfl, Jr. et al. | |
| 5,552,504 A | 9/1996 | Bennett et al. | |
| 5,637,400 A | 6/1997 | Brekner et al. | |
| 5,679,812 A | 10/1997 | Winter et al. | |
| 5,688,887 A | 11/1997 | Bagheri et al. | |
| 5,690,832 A | 11/1997 | Tavlarides et al. | |
| 5,705,577 A | 1/1998 | Rossi et al. | |
| 5,731,254 A | 3/1998 | Winter et al. | |
| 5,807,949 A * | 9/1998 | Rossi et al. | 526/348.3 |
| 5,811,379 A | 9/1998 | Rossi et al. | |
| 5,846,896 A | 12/1998 | Ewen | |
| 5,852,143 A | 12/1998 | Sishta et al. | |
| 5,859,159 A * | 1/1999 | Rossi et al. | 526/170 |
| 6,043,401 A | 3/2000 | Bagheri et al. | |
| 6,087,307 A | 7/2000 | Kaminski et al. | |
| 6,133,209 A | 10/2000 | Rath et al. | |
| 6,147,271 A | 11/2000 | Strebel et al. | |
| 6,180,575 B1 | 1/2001 | Nipe | |
| 6,388,032 B1 | 5/2002 | Yamaura et al. | |
| 6,414,090 B2 | 7/2002 | Minami et al. | |
| 6,414,091 B2 | 7/2002 | Moritomi et al. | |
| 6,479,722 B1 | 11/2002 | De Wet et al. | |
| 6,548,723 B2 | 4/2003 | Bagheri et al. | |
| 6,548,724 B2 | 4/2003 | Bagheri et al. | |
| 6,642,169 B2 * | 11/2003 | Weatherhead | 502/118 |
| 6,646,174 B2 | 11/2003 | Clarembeau | |
| 6,706,828 B2 | 3/2004 | DiMaio | |
| 6,713,438 B1 | 3/2004 | Baillargeon et al. | |
| 6,824,671 B2 | 11/2004 | Goze et al. | |
| 6,858,767 B1 * | 2/2005 | DiMaio et al. | 585/521 |
| 6,960,700 B1 | 11/2005 | Sethna et al. | |
| 7,060,768 B2 | 6/2006 | Brookhart et al. | |
| 7,129,197 B2 | 10/2006 | Song et al. | |
| 7,129,306 B2 * | 10/2006 | DiMaio | 526/348 |
| 7,473,815 B2 | 1/2009 | Lambert et al. | |
| 7,544,850 B2 | 6/2009 | Goze et al. | |
| 7,547,811 B2 | 6/2009 | Kramer et al. | |
| 7,592,497 B2 | 9/2009 | Yang et al. | |
| 7,601,256 B2 | 10/2009 | Beall | |
| 2001/0041817 A1* | 11/2001 | Bagheri et al. | 585/517 |
| 2001/0041818 A1 | 11/2001 | Bagheri et al. | |
| 2003/0055184 A1 | 3/2003 | Song et al. | |
| 2004/0022508 A1 | 2/2004 | Belardi et al. | |
| 2004/0033908 A1 | 2/2004 | Deckman et al. | |
| 2004/0087746 A1 | 5/2004 | Razavi | |
| 2004/0097772 A1 | 5/2004 | Deckers et al. | |
| 2004/0147693 A1 | 7/2004 | DiMaio | |
| 2004/0220359 A1 | 11/2004 | Abhari et al. | |
| 2004/0230016 A1 | 11/2004 | Blackbrow et al. | |
| 2005/0059563 A1 | 3/2005 | Sullivan et al. | |
| 2005/0101761 A1 | 5/2005 | Lambert et al. | |
| 2005/0183988 A1 | 8/2005 | Freerks et al. | |
| 2007/0000807 A1 | 1/2007 | Wu et al. | |
| 2007/0010215 A1 | 1/2007 | Porco et al. | |
| 2007/0011832 A1 | 1/2007 | Keidel et al. | |
| 2007/0043248 A1 | 2/2007 | Wu et al. | |
| 2007/0208151 A1 | 9/2007 | Okada et al. | |
| 2007/0298990 A1* | 12/2007 | Carey et al. | 508/591 |
| 2009/0005279 A1 | 1/2009 | Wu et al. | |
| 2009/0156874 A1 | 6/2009 | Patil et al. | |
| 2009/0281360 A1 | 11/2009 | Knowles et al. | |
| 2010/0069687 A1 | 3/2010 | Kosover et al. | |

FOREIGN PATENT DOCUMENTS

| | | |
|---|---|---|
| EP | 0 277 007 | 8/1988 |
| EP | 279586 | 8/1988 |
| EP | 0 284 708 | 10/1988 |
| EP | 0 321 852 | 6/1989 |
| EP | 0 349 276 | 1/1990 |
| EP | 0 377 306 | 7/1990 |
| EP | 0 403 866 | 12/1990 |
| EP | 0 513 380 | 11/1992 |
| EP | 561476 | 9/1993 |
| EP | 570982 | 11/1993 |
| EP | 594218 | 4/1994 |
| EP | 0 613 873 | 9/1994 |
| EP | 0 680 942 | 11/1995 |
| EP | 0 930 320 | 7/1999 |
| EP | 0 992 517 | 4/2000 |
| EP | 1 028 128 | 8/2000 |
| EP | 1 309 633 | 5/2003 |
| EP | 1 342 707 | 9/2003 |
| EP | 1 607 415 | 12/2005 |
| GB | 938069 | 9/1963 |
| IN | 191553 | 12/2003 |
| JP | 6336590 | 12/1994 |
| JP | 2005-200446 | 7/2005 |
| WO | 94/10180 | 5/1994 |
| WO | 96/23751 | 8/1996 |
| WO | WO 99/67437 | 12/1999 |
| WO | 00/58423 | 10/2000 |
| WO | 02/14384 | 2/2002 |
| WO | 03/009136 | 1/2003 |
| WO | 03/051943 | 6/2003 |
| WO | 03/071369 | 8/2003 |
| WO | 03/104292 | 12/2003 |
| WO | 2004/046214 | 6/2004 |
| WO | 2007/011462 | 1/2007 |
| WO | WO 2007/011459 | 1/2007 |
| WO | WO 2007/011832 | 1/2007 |
| WO | WO 2007/011973 | 1/2007 |
| WO | WO 2007/145924 | 12/2007 |
| WO | WO 2007/146081 | 12/2007 |
| WO | WO 2008/010862 | 1/2008 |
| WO | WO 2008/010865 | 1/2008 |
| WO | 2009/017953 | 2/2009 |
| WO | 2009/137264 | 11/2009 |

OTHER PUBLICATIONS

A. Munoz-Escalona et al., "*Single-Site Supported Catalysts for Ethylene Polymerization*", Metallocene Tech., 1999, pp. 2242-2246.

Z. Fan et al., "*Effect of Ethoxy- And Methoxysilane Donors in Propene/1-Hexene Copolymerization With High-Yield Supported Ziegler-Natta Catalysts*", Macromolecular Chemistry and Physics, 1994, vol. 195, pp. 3889-3899.

G. Gokel ed, Dean's Handbook of Organic Chemistry, 2nd Edition, McGraw-Hill, 2004, available on-line at hhttp://knovel.com.

M. LeVan et al. "*Adsorption and Ion Exchange*" Perry's Chemical Engineer's Handbook, 7th ed. 1997 pp. 16-1-16-66.

O. Levenspiel, "*Ch. 7 Design for Multiple Reactions*", Chemical Reaction Engineering, 2nd ed., 1972, pp. 196-209.

N. Naga et al., "*Effect of Co-Catalyst System on a-Olefin Polymerization With Rac- And Meso-[Dimethylsilylenebis(2,3,5-Trimethyl-Cyclopentadienyl)]Zirconium Dichloride*", Macromol. Rapid Commun., 1997, vol. 18, pp. 581-589.

N. Naga et al, "*Polymerization Behavior of a-Olefins With Rac- and Meso-Type Ansa-Metallocene Catalysts: Effects of Cocatalyst and Metallocene Ligand*", Macromolecular Chemistry Physics, 1999, vol. 200, pp. 1587-1594.

F. Rodriguez, "*The Molecular Weight of Polymers*", Principles of Polymer Systems, 1970, Chapter 6, pp. 115-144.

M. Sacchi et al., "*Use of Different Alkoxysilanes as External Donors in $MgCl_2$-Supported Ziegler-Natta Catalysts to Obtain Propene/1-*

(56) References Cited

OTHER PUBLICATIONS

Butene Copolymers With Different Microstructure", Macromolecular Chemistry and Physics, 1994, vol. 195, pp. 2805-2816.

T. Seraidaris et al., "*High-Molar-Mass Polypropene with Tunable Elastic Properties by Hafnocene/Borate Catalysts*", Journal of Polymer Science: Part A: Polymer Chemistry, 2006, vol. 44, pp. 4743-4751.

J. Wills, "*Synthetic Lubricants*", Lubrication Fundamentals, Marcel Dekker Inc., New York, 1980, pp. 75-80.

"*Mobil Releases SuperSyn PAOs*", Lubrication Engineers, 1999, vol. 55, Part 8, pp. 45.

TIBA data, "*TIBA datasheet*" available on-line at www.albermarle.com on Aug. 26, 2010.

E. Riedel, Editor, Walter DeGruyter, Berlin NY, 1999, Moderne Anorganische Chemie, Title page and pp. 696 and 697.

"Industrial Technology of Next Generation Polymer by Metallocene Catalyst", title page, p. 993 and page with publication data (published on May 20, 1995) and Partial Translation thereof.

"Living Polymerization by Homogeneous Transition Metal Catalyst" title page, pp. 46 and 47 and page with publication data (published on May 20, 1999) and Partial Translation thereof.

"New Polymer Produced by Metallocene Catalyst" title page, pp. 53 to 55 and page with publication data (published on Apr. 20, 1999) and Partial Translation thereof.

\* cited by examiner

PRODUCTION OF SHEAR-STABLE HIGH VISCOSITY PAO

CROSS REFERENCE TO RELATED APPLICATIONS

This application claims the benefit of prior U.S. provisional application Ser. No. 61/040,855 filed Mar. 31, 2008, which is hereby incorporated by reference in its entirety.

FIELD OF THE INVENTION

The invention relates to the production of high viscosity polyalphaolefins (PAO).

BACKGROUND OF THE INVENTION

Lubricant viscosity is an important element for equipment builders and automotive manufacturers to consider. The viscosity of the lubricant is directly related to the thickness of the protective lubricant film formed in service. The viscosity of the lubricant also affects its circulation rate in small passageways in the equipment being lubricated. Equipment components are therefore specifically selected and designed to be used with lubricants of a specified viscosity. Maintenance of suitable viscosity is therefore critically important for proper operation of lubricated equipment.

Resistance to degradation is desirable for lubricants in service. Lubricants decompose via a number of different mechanisms or pathways: thermal, oxidative and hydrolytic mechanisms are well known. During thermal and hydrolytic decomposition, the lubricant is usually broken down into smaller fragments. During oxidative decomposition, higher molecular weight sludges are often formed. In each of these pathways, byproducts are also formed, often acids. These byproducts can catalyze further degradation, resulting in an ever increasing rate of degradation.

Since the lubricant viscosity is affected by the various decomposition pathways, and maintenance of lubricant viscosity is critical, lubricant viscosity is frequently checked in almost all lubricant applications. The in-service viscosity is compared against the fresh oil viscosity to detect deviation indicative of degradation. Viscosity increase and viscosity decrease are both signs of potential lubricant degradation.

In industrial lubricant application, lube viscosity is classified by ISO viscosity grade. ISO Viscosity Grade standards have a ±10% window centered around the specified viscosity. For example, lubricants with a viscosity of 198 cSt and 242 cSt would be considered just in-grade for the ISO VG 220 specification. Lubricants which fall out of the ISO VG specifications may still be effective lubricants in service. However, since known degradation mechanisms result in viscosity changes, many equipment owners will replace lubricants which fall outside of the ISO VG limits. This decision may also be driven by such factors as equipment warranty or insurance requirements. Such considerations may be very important for expensive industrial equipment. The cost of downtime for lubricant related failures can also play a role in the lubricant change-out decision. If downtime is very expensive relative to the cost of lubricant, tighter criteria for lubricant change-out will often be used.

Other lubricants, such as automotive engine lubricants or transmission fluids or automotive gear oil or axle lubricants or grease, are also classified by different viscosity ranges, as described by SAE (Society of Automotive Engineers) J300 or J306 specifications, or by AGMA (American Gear Manufacturers Association) specifications. These lubricants will have the same issues as industrial lubricants described in previous paragraph.

One benefit of premium lubricants is the potential for extended life, reducing the change-out interval. Extended lubricant life is one feature that offsets the higher initial fill cost for premium lubricants. In order to achieve an extended lubricant life, premium lubricants must demonstrate a more stable viscosity in service. Using higher quality base stocks and advanced additive systems, these lubricants counter the effects of thermal, oxidative and hydrolytic attack.

In addition to the chemical mechanisms for viscosity change discussed above, however, another mechanism for viscosity change is mechanical in nature. Viscosity loss due to severe shear stress in a lubricant occurs when lubricant molecules are fractured in high shear zones in the equipment. These zones exist in many loaded gears, roller bearings, or engine pistons at high rpm. As lubricant is circulated through these zones, different parts of the lubricant base stock molecules are subjected to different mechanical stress, causing the molecules to permanently break down into smaller pieces, resulting in reduction in lubricant viscosity. This shear viscosity breakdown is specifically problematic with high viscosity lubricant base stocks due to their high molecular weight components.

A sheared-down lubricant may still retain excellent resistance to thermal, oxidative or hydrolytic degradation, however, a lubricant with out of range viscosity can lead to premature change-out for the same reasons cited earlier, e.g., due to warranty, insurance or downtime prevention. On the other hand, a sheared-down lubricant may initiate other undesirable degradation processes, such as oxidation, hydrolysis, etc., leading to reduced lubricant life time. Thus it is desirable to avoid the loss of viscosity by mechanical mechanism as well as chemical mechanisms discussed above.

One important example of the need for extended resistance to mechanical breakdown is in wind turbines gear boxes. Generally, these operate with slow moving gears which are highly loaded, and thus highly susceptible to mechanical breakdown. In addition, wind turbines tend to be located in inaccessible locations, such as the North Sea. The susceptibility to mechanical breakdown and inaccessibility is also present in many hydraulic applications. Accordingly, it would be highly desirable to have a lubricant for wind turbine gear boxes, hydraulic applications, and the like, wherein the lubricant has a high resistance to mechanical breakdown over a very long period of time.

The viscosity loss by mechanical shear down of a lubricant or lubricant base stock can be measured by several methods, including Tapered Roller Bearing (TRB) test according to CEC L-45-T-93 procedure, Orbahn (ASTM D3945) or Sonic Shear Tests (ASTM D2603). The TRB test is believed to correlate better to the actual field shear stability performance of viscous fluids than the other shear tests.

One important variable in determining susceptibility of a base stock to shear viscosity breakdown is its molecular weight distribution (MWD). Molecular weight distribution (MWD), defined as the ratio of weight-averaged MW to number-averaged MW (=Mw/Mn), can be determined by gel permeation chromatography (GPC) using polymers with known molecular weights as calibration standards. Typically, base stocks with broader MWD are more prone to shear viscosity breakdown than base stocks with narrower MWD. This is because the broad MWD base stock usually has a larger high molecular weight fraction, which breaks down easier in high stress zones than the narrow MWD base stock, which has a much lower high molecular weight fraction.

To obtain shear stable lubricants, it is therefore desirable to have a narrow MWD. One way to achieving narrow MWD is to use metallocene catalysts, which was discovered by Sinn and Kaminsky based on early transition metals (Zr, Ti, Hf) with methylaluminoxane (MAO). Soon after the appearance of metallocene catalysts in 1980 their advantages over the conventional multi-site Ziegler-Natta and chromium catalysts were recognized. Thus, they are highly active catalysts exhibiting an exceptional ability to polymerize olefin monomers, producing uniform polymers and copolymers of narrow molecular weight distribution (MWD of less than or equal to about 2) and narrow chemical compositional distribution, controlling at same time the resulting polymer chain architectures.

WO1999067437 disclosed the use of MAO-activated metallocenes with Al/Metallocene mole ratios of 100:1 to 10,000:1 to give poly-1-decene with excellent shear stability when compared to polymethacrylates in multi-grade transmission oil formulation. Products described therein were made in a batch mode and no distinction was made of using other processing methods to improve the molecular weight distribution and the shear stability of the fluid.

The use of single-site metallocene catalysts in the oligomerization of various alphaolefin feeds is known per se, such as in WO2007/011832, WO2007/011459, WO2007/01 1973, and PCT/US2007/010215.

A lubricant having higher stability to the various degradation mechanisms discussed above than is currently available, and able to meet, by itself or in a blend, industrial specifications such as ISO VG and SAE grades is highly sought after.

The present inventors have surprisingly discovered that high shear stable lubricant base stocks may be prepared by contacting alphaolefin feedstocks with single-site metallocene catalysts in a mixed flow or continuous stirred tank reactors.

SUMMARY OF THE INVENTION

The invention is directed to a process for the preparation of high viscosity lubricant base stocks by contacting alphaolefin feedstocks with single-site metallocene catalysts in a mixed flow or continuous stirred tank reactors.

In embodiments, lubricant bases stocks are obtained having at least one of narrow MWD and improved shear stability These and other objects, features, and advantages will become apparent as reference is made to the following detailed description, preferred embodiments, examples, and appended claims.

DETAILED DESCRIPTION OF THE INVENTION

According to the invention, single-site metallocene catalysts are contacted with a feedstock in a mixed flow or continuous stirred tank reactors (CSTR) operation to prepare high viscosity lubricant-range PAO base stocks.

As used herein, the term "high-viscosity PAO" means polyalphaolefins having a kinematic viscosity measured at 100° C. ($KV_{100}$) of greater than 10 cSt to about 10,000, and "low viscosity PAO" means polyalphaolefins having a $KV_{100}$ of up to 10 cSt.

In embodiments, lubricant base stocks are obtained having at least one of narrow MWD and improved shear stability.

Continuous Stirred Tank Reactors

Continuous Stirred Tank Reactors (CSTR) are per se well-known. The effects of reactor design and operation on molecular weight distribution was studied previously, but there is no simple conclusion how reactor operation will effect MWD, as discussed in *J. Applied Chem.*, 1, 227 [1951]. Other discussion of CSTR operation and other reactor operation can be found in Perry's Chemical Engineers' Handbook, 7th Ed. 23-36 CHEMICAL REACTORS, or K. G. Denbigh, Trans. Faraday Soc, 43, 648 (1947) or Levenspiel, Chemical Reaction Engineering, 2nd ed., 1972 John Wiley and Sons. p. 196.

In semi-batch operation mode or in Continuous Stirred Tank Reactor (CSTR) operation the reaction can be conducted at a polymerization temperatures ranging from 0° C. to 200° C., residence time can be varied between 1 min to 20 hrs. Metallocene loading ranging from 1 g of catalyst per 1,000 g of olefins to 1 g of catalyst per 600,000 g of alpha olefins. Operating pressure can range from atmospheric to 1000 psig. Optionally, hydrogen partial pressure can range from 1 psi to 200 psi based upon the total pressure in the head space of the reactor when the reactor is operated in a partial filled mode or the concentration of the hydrogen is from 1 to 30,000 ppm by weight in liquid filled reactor operation mode. In embodiments, the operating conditions are: polymerization temperature: 40 to 150° C., residence time: 1 hour to 4 hour, catalyst loading 1 g per 10,000 g to 500,000 g of the feed olefins. Operating pressure: atmospheric to 500 psig.

Feedstocks

PAOs comprise a well-known class of hydrocarbons manufactured by the catalytic oligomerization (polymerization to low-molecular-weight products) of linear α-olefin (LAO) monomers. These typically range from 1-hexene to 1-tetradecene, although 1-decene is typically preferred. One of the particular advantages of the process according to the present invention is that, in embodiments, the improvement is not only limited to pure 1-decene as feed, but also applies to wide range of single or mixed alpha-olefins as feed, including feeds comprising one or more of 1-hexene, 1-octene, 1-decene, 1-dodecene, and 1-tetradecene.

When employing a mixed feed, one acceptable mixed feed (to the first reactor in the case of multiple reactors or to the single reactor in the case of semi-batch mode) is a mixture of 1-hexene, 1-decene, 1-dodecene, and 1-tetradecene. Mixtures in all proportions may be used, e.g., from about 1 wt % to about 90 wt % 1-hexene, from about 1 wt % to about 90 wt % 1-decene, from about 1 wt % to about 90 wt % 1-dodecene, and from about 1 wt % to about 90 wt % tetradecene. In preferred embodiments, 1-hexene is present in the amount of about 1 wt % or 2 wt % or 3 wt % or 4 wt % or 5 wt % to about 10 wt % or 20 wt %, 1-decene is present in the amount of about 25 wt % or 30 wt %, or 40 wt %, or 50 wt % to about 60 wt % or 70 wt % or 75 wt %, 1-dodecene is present in the amount of about 10 wt % or 20 wt % or 25 wt % or 30 wt % or 40 wt % to about 45 wt % or 50 wt % or 60 wt %, and 1-tetradecene is present in the amount of 1 wt % or 2 wt % or 3 wt % or 4 wt % or 5 wt % or 10 wt % or 15 wt % or 20 wt % or 25 wt % to about 30 wt % or 40 wt % or 50 wt %. Ranges from any lower limit to any higher limit just disclosed are contemplated, e.g., from about 3 wt % to about 10 wt % 1-hexene or from about 2 wt % to about 20 wt % 1-hexene, from about 25 wt % to about 70 wt % 1-decene or from about 40 wt % to about 70 wt % 1-decene, from about 10 wt % to about 45 wt % 1-dodecene or from about 25 wt % to about 50 wt % 1-dodecene, and from about 5 wt % to about 30 wt % 1-tetradecene or from about 15 wt % to about 50 wt % 1-tetradecene. Numerous other ranges are contemplated, such as ranges plus or minus 5% (±5%) from those specified in the examples.

While minor proportions of other linear alphaolefins (LAO) may be present, such as 1-octene, in the above embodiments the mixed feed (or mixture of alphaolefins contacting the oligomerization catalyst and promoters) consists essentially of 1-hexene, 1-decene, 1-dodecene, 1-tetradecene, wherein the phrase "consists essentially of" (or "consisting essentially of" and the like) takes its ordinary meaning, so that no other LAO is present (or for that matter nothing else is present) that would affect the basic and novel features of the present invention. In yet another preferred embodiment the feed (or mixture of alphaolefins) consists of 1-hexene, 1-decene, 1-dodecene, 1-tetradecene, meaning that no other olefin is present (allowing for inevitable impurities).

Another mixed feedstock useful in the present invention is a mixed feed of 1-hexene, 1-decene, and 1-tetradecene. Mixtures in all proportions may be used, e.g., from about 1 wt % to about 90 wt % 1-hexene, from about 1 wt % to about 90 wt % 1-decene, and from about 1 wt % to about 90 wt %. In preferred embodiments, the 1-hexene is present in amounts of 1 wt % or 2 wt % or 3 wt % or 4 wt % or 5 wt % to about 10 wt %, 20 wt %, 25 wt %, or 30 wt %, 1-decene is present in the amount of about 25 wt % or 30 wt %, or 40 wt %, or 50 wt % to about 60 wt % or 70 wt % or 75 wt %, and 1-tetradecene is present in the amount of 1 wt % or 2 wt % or 3 wt % or 4 wt % or 5 wt % or 10 wt % or 15 wt % or 20 wt % or 25 wt % to about 30 wt % or 40 wt %. Ranges from any lower limit to any higher limit just disclosed are contemplated.

Mixed feedstocks of two LAO's are also contemplated by the present invention. Such two component feedstocks may be blends of 1-hexene and 1-decene, 1-hexene and 1-dodecene, 1-decene and 1-dodecene, 1-decene and 1-tetradecene, or 1-dodecene and 1-tetradecene. For such two LAO mixed feedstocks, either component may be present in amounts of 1-99 wt %, with preferred ranges for both components being in the ranges of 10 to 90 wt %, 15 to 85 wt %, 20 to 80 wt %, or 30 to 70 wt %.

In other embodiments the olefin feed consists essentially of a single LAO such as 1-decene or 1-dodecene.

Particularly advantaged feedstocks include those C4-C18 alpha-olefin sources described in WO2007/011832, e.g., alpha-olefins derived from an ethylene growth process, from Fischer-Tropsch synthesis, from steam or thermal cracking processes, syn-gas synthesis, C4 stream containing 1-butene from refinery operation, such as Raff-1 or Raff-2 stream, and so forth.

In an embodiment, the olefins used in the feed are co-fed into the reactor. In another embodiment, the olefins are fed separately into the reactor. In either case, the catalyst/promoters may also be feed separately or together, with respect to each other and with respect to the LAO species.

Catalyst System

The catalyst system comprises a metallocene compound together with the activator. The metallocene may be bridged or unbridged, and it may be meso-, racemic, or metallocenes with C1 symmetry, C2v symmetry or Cs symmetry, or mixtures thereof. For the purpose of the present invention, the term "catalyst system" includes the single site metallocene catalyst and activator pair. When "catalyst system" is used to describe such a pair before activation, it means the unactivated catalyst (precatalyst) together with an activator and, optionally, a co-activator (such as a trialkyl aluminum compound). When it is used to describe such a pair after activation, it means the activated catalyst and the activator or other charge-balancing moiety. Furthermore, this activated "catalyst system" may optionally comprise the co-activator and/or other charge-balancing moiety.

Single Site Metallocene Catalysts

Catalysts suitable for the process of the present invention include single-site metallocene catalyst systems, such as described in WO2007/011832, WO2007/011459, and WO2007/011973. The preferred metal is selected from Group 4 transition metals, preferably zirconium (Zr), hafnium (Hf) and titanium (Ti).

Preferred single-site catalysts for the present invention include racemic mixtures of silyl-zirconium complexes, such as dimethylsilylbis[tetrahydroindenyl]zirconium dimethyl. The dichloro analog is also a preferred catalyst.

Also preferred are the partially or fully hydrogenated indenyl rings.

Preferred single-site catalysts can also include bridged (cyclopentadienyl) (9-fluorenyl)ZrCl2 or their analogs.

Preferred single-site catalysts for the present invention include catalysts such as rac-dimethyl-silyl-bis(4,5,6,7-tetrahydroindenyl)zirconium dichloride or rac-dimethyl-silyl-bis(4,5,6,7-tetrahydroindenyl)zirconium dimethyl, rac-dimethyl-silyl-bis(indenyl)zirconium dichloride or rac-dimethyl-silyl-bis(indenyl)zirconium dimethyl, rac-ethylidene-bis(4,5,6,7-tetrahydroindenyl)zirconium dichloride or rac-ethylidene-bis(4,5,6,7-tetrahydroindenyl)zirconium dimethyl, rac-ethylidene-bis(indenyl)zirconium dichloride or rac-ethylidene-bis(indenyl)zirconium dimethyl, meso-dimethyl-silyl-bis(4,5,6,7-tetrahydroindenyl)zirconium dichloride or meso-dimethyl-silyl-bis(4,5,6,7-tetrahydroindenyl)zirconium dimethyl, meso-dimethyl-silyl-bis(indenyl)zirconium dichloride or meso-dimethyl-silyl-bis(indenyl)zirconium dimethyl, meso-ethylidene-bis(4,5,6,7-tetrahydroindenyl)zirconium dichloride or meso-ethylidene-bis(4,5,6,7-tetrahydroindenyl)zirconium dimethyl, meso-ethylidene-bis(indenyl)zirconium dichloride or meso-ethylidene-bis(indenyl)zirconium dimethyl. Other preferred single-site catalysts include the aforementioned racemic or meso catalysts with different degree of substituted indenyl ligands. Other preferred catalysts include diphenylmethylidene(cyclopentadienyl)(9-fluorenyl)zirconium dichloride, dimethylsilyl(cyclopentadienyl)(9-fluroenyl)ZrCl2 or diphenylsilyl(cyclopentadienyl)(9-fluorenyl)zirconium.

Other preferred metallocenes include the unbridged metallocenes such as bis(cyclopentadienyl)zirconium dichloride, bis(cyclopentadienyl)zirconium dimethyl, bis(1,2-dimethylcyclopentadienyl)zirconium dichloride, bis(1,2-dimethylcyclopentadienyl)zirconium dimethyl, bis(1,3-dimethylcyclopentadienyl)zirconium dichloride, bis(1,3-dimethylcyclopentadienyl)zirconium dimethyl, bis(1,2,3-trimethylcyclopentadienyl)zirconium dichloride, bis(1,2,3-trimethylcyclopentadienyl)zirconium dimethyl, bis(1,2,4-trimethylcyclopentadienyl)zirconium dichloride, bis(1,2,4-trimethylcyclopentadienyl)zirconium dimethyl, bis(1,2,3,4-tetramethylcyclopentadienyl)zirconium dichloride, bis(1,2,3,4-tetramethylcyclopentadienyl)zirconium dimethyl, bis(pentamethyl-cyclopentadienyl)zirconium dichloride, bis(pentamethylcyclopentadienyl)zirconium dimethyl, and other substituted analogs.

Activator

The activator may be a non-coordinating anion (NCA) activator or a trialkyl aluminum compound such as methylaluminoxane (MAO). For purposes of this invention and the claims thereto noncoordinating anion (NCA) is defined to mean an anion which either does not coordinate to the catalyst metal cation or that coordinates only weakly to the metal cation. An NCA coordinates weakly enough that a neutral Lewis base, such as an olefinically or acetylenically unsaturated monomer, can displace it from the catalyst center. Any metal or metalloid that can form a compatible, weakly coordinating complex with the catalyst metal cation may be used or contained in the noncoordinating anion. Suitable metals include, but are not limited to, aluminum, gold, and platinum. Suitable metalloids include, but are not limited to, boron, aluminum, phosphorus, and silicon. A subclass of non-coordinating anions comprises stoichiometric activators, which can be either neutral or ionic. The terms ionic activator, and stoichiometric ionic activator can be used interchangeably. Likewise, the terms neutral stoichiometric activator and Lewis acid activator can be used interchangeably.

The preferred activator for the present invention is an NCA, preferably such as one described in U.S. Pat. No. 7,279,536, or as described in WO2007/011832. These activators are per se well-known.

The more preferred NCA is $C_{32}H_{12}F_{20}NB$ (n,n-dimethylanilinium tetrakis(penta-fluorphenyl)borate.

Usually, the catalyst system also include a co-activator, which is usually a trialkylaluminum compounds. This trialkyl aluminum compounds can also be used effectively as a impurity or poison scavenger for the reactor system. Most preferred trialkyl aluminum compounds are tri-isobutylaluminum, tri-n-octylaluminum or tri-n-hexylaluminum or tri-n-decylaluminum, tri-n-octylaluminum, etc.

Other components used in the reactor system can include inert solvent, catalyst diluent, etc. These components can also be recycled during the operation Lube Product Isolation When the polymerization or oligomerization reaction is progressed to the pre-determined stage, such as 70 or 80% or 90% or 95% alpha-olefin conversion, the reactor effluent is withdrawn from the reactor. Usually the reaction product should be treated in the same manner as described in U.S. Patent Application Publication No. 2008/0020928 (having a priority date of Jul. 19, 2006; U.S. Provisional Application No. 60/831,995). In the preferred manner, the catalyst should be deactivated by introduction of air, $CO_2$ or water or other deactivator to a separate reaction vessel. The catalyst components can be removed by methods described in the aforementioned U.S. Patent Application Publication No. 2008/0020928 or by washing with aqueous base or acid followed by separating the organic layer as in conventional catalyst separation method. After the catalyst removal, the effluent can be subjected to a distillation to separate the un-reacted feed olefins, inert solvents and other lighter components from the heavier oligomerization product. Depending on the polymerization reaction conditions, this oligomerization product may have high degree of unsaturation as measured by bromine number (ASTM D 1159 method or equivalent method). If the bromine number is judged too high, the heavy oligomer fraction is subjected to a hydrofinishing step to reduce the bromine number, usually to less than 3 or less than 2 or less than 1, depending on hydrofinishing conditions and the desired application of the PAO base stock. Typical hydrogenation step can be found in many published patents and literatures of PAO production process. Sometimes, when the PAO products have very high molecular weight or hydrogen is used during the polymerization step, the isolated PAO products will naturally have very low brominue number or degree of unsaturation, the product can be used directly in many applications without a separate hydrogenation step.

The light fraction, as separated directly from the reactor effluent or further fractionated from the light fraction contains un-converted alpha-olefins. This light fraction can be recycled with or without any purge, into the polymerization reactor for further conversion into lube product. Or, this fraction as is, or the appropriated fractions, can be recycled into the polymerization reactor, after passing through a feed pretreatment column containing the typical polar component removing agent, such as activated alumina, molecular sieve, or other active sorbents. This pre-treatment column can remove any of the impurity from the catalyst residual or other impurities. Alternatively, this fraction can be combined with fresh feed olefins before feed purification column.

Recycled Feed Olefin Stream

The amount of the fraction containing the un-reacted olefins from the reactor effluent ranges from 1% to 70% of the fresh feed olefins, depending on the conversion, the amount of inert components and solvents used in the reaction. Usually this amount ranges from 5% to 50% and more commonly, from 5% to 40% of the fresh feed olefin. This fraction containing the un-reacted olefins can optionally be recycled into the polymerization reactor in 100% or sometimes only part of the fraction, ranging from 99% to 20%, alternatively 95% to 40%, or alternatively 90% to 50%, is re-cycled into the polymerization reactor. The amount of this fraction to be recycled depends on the composition of the fraction and how much inert components or solvents the polymerization reactor can tolerate. Usually, the higher the amount of recycle, the better the total lube yields and better alpha-olefin usage and better process economics.

The fraction containing the un-reacted olefins from the reactor effluent can be recycled into the polymerization reactor by itself; or more commonly, the un-reacted olefins fraction is co-fed into the polymerization reactor with some fresh alpha-olefins. The weight % of the recycled un-reacted olefin fractions in the total feed ranges from 0% to 100%. More commonly, the weight % of ranges from 0.1% to 70%, or alternatively 0.5% to 50% or alternatively, 1% to 30%. Or during a continuous operation, this weight % can change depending on selected degree of conversion, product viscosity, degree of purge stream, etc. Sometimes when making high viscosity product, higher percentage of the recycled stream is used to reduce reactor viscosity and enhance reactor control.

The fraction containing the un-reacted olefins usually contains the feed alpha-olefins, internal olefins or di- or tri-substituted olefins, small oligomers of the starting alpha-olefins and other inert components, such as solvents and diluents, etc. In this recycled stream, the amount of internal olefins, di-, tri-susbstituted olefins, solvents and diluents are usually in higher concentration than the fresh feed olefins. In other words, the amount of reactive alpha-olefins is usually lower than the fresh feed olefins. The amount of alpha-olefins can range from 2% to 80% and usually is not more than 70%. However, surprisingly, we found that this fraction containing low amount of alpha-olefins can be converted into high quality lube base stock in the similar manner as the fresh feed over the metallocene catalyst with high lube yields and high catalyst productivity. Furthermore, the product property from this recycled olefin stream or the mixture of recycled olefin stream with fresh feed, are similar to 100% fresh feed or in some cases, product can advantageously have lower viscosity.

EXPERIMENTAL

The invention may be better understood, and additional benefits to be obtained thereby realized, by reference to the following examples. These examples should be taken only as illustrative of the invention rather than limiting, and one of ordinary skill in the art in possession of the present disclosure would understand that numerous other applications are possible other than those specifically enumerated herein.

The shear stability data (TRB test) were generated at SouthWest Research Institute in San Antonio, Tex., using CEC L-45-A-99 procedure at 20 hours. During this test, the oil is tested in a tapered roller bearing fitted into a Four-Ball EP test machine. The taper roller bearing, submerged in 40 ml of test fluid, was rotated at 1475 rpm with a load of 5000 Newton at 60° C. for a standard duration of 20 hours. When the test is completed, the used fluid viscosity is measured and % viscosity loss was calculated from the sample viscosity before and after the test. The severity of the TRB test can be increased by extending the test duration up to 100 or 200 hours.

Molecular weight distribution (MWD), defined as the ratio of weight-averaged MW to number-averaged MW (=Mw/Mn), can determined by gel permeation chromatography (GPC) using polymers with known molecular weights as calibration standards, as described in p. 115 to 144, Chapter 6, The molecular Weight of Polymers in "Principles of Polymer Systems" (by Ferdinand Rodrigues, McGraw-Hill Book, 1970).

The present inventors have also discovered that the MWD distribution should be as a function of viscosity at least 10 percent less than algorithm MWD=0.2223+[1.0232*log (Kv at 100° C. in cSt)]. More preferably, the mPAO should have a molecular weight distribution at least 10 percent less than the algorithm: MWD=0.41667+[0.725*log (Kv at 100° C. in cSt)]. Most preferably, the mPAO should have a molecular weight distribution at least 10 percent less than the algorithm: MWD=0.66017+[0.44922*log (Kv at 100° C. in cSt)].

EXAMPLES 1 TO 6

The following experiments were carried out in a continuous reactor. These runs demonstrated the use of non-coordinating anion (NCA) as activator, high lube yields and or narrow molecular weight distribution. 1-decene and toluene used in the runs were purified through a 5 Angstrom molecular sieve.

The metallocene catalyst used was dimethylsilylbis[tetrahydroindenyl]zirconium dimethyl.

The activator used was N,N-dimethylanilinium tetra(pentafluorophenyl)borate.

A catalyst solution was prepared by pre-mixing metallocene with the activator in toluene solution to give 0.8 micromole catalyst per ml of solution. The experiments were conducted in a series dual-reactor continuous solution process. Both of the reactors were 1-liter autoclave reactors. All feeds were introduced into the first reactor continuously at fixed rates. Both of the reactors were controlled at the same reaction temperature. The catalyst solution, a scavenger tri-n-octylaluminum (TNOA) solution, and purified 1-decene were continuously pumped into a stirred one-liter stainless autoclave heated to reaction temperature. Reaction product was continuously withdrawn from the autoclave, quenched, and washed with water. The organic layer was further distilled at high temperature to remove any C20 and lighter components. The residual oil was then hydrogenated using 1 wt % Ni-on-Kieselguhr catalyst at 200° C., 800 psi (5.5 MPa) hydrogen pressure for 4 hours. The bromine numbers for all samples after hydrogenation were much below 1. The reaction conditions and the hydrogenated finished lube properties are summarized in the following Table 1. This set of data demonstrates that a wide range of viscosities can be produced at high productivities. Also, these data show that a wide range of mm contents, ranging from 86% to 51%, can be produced. This data further demonstrated that the MWD of the lube products as analyzed by GPC were all very narrow.

TABLE 1

1-Decene polymerization by CSTR Reactor

| | Example No. | | | | | |
|---|---|---|---|---|---|---|
| | 1 | 2 | 3 | 4 | 5 | 6 |
| Reaction Temperature, ° C. | 50 | 60 | 70 | 80 | 90 | 100 |
| Feed Rates | | | | | | |
| 1-decene, ml/min | 40 | 40 | 40 | 40 | 40 | 40 |
| metallocene (dimethyl), mol/min | 2.39E−06 | 2.39E−06 | 3.73E−06 | 3.73E−06 | 3.73E−06 | 3.73E−06 |
| activator, mol/min | 1.20E−06 | 1.20E−06 | 1.87E−06 | 1.87E−06 | 1.87E−06 | 1.87E−06 |
| Scavenger TNOA, mol/min | 7.57E−10 | 7.57E−10 | 9.10E−10 | 9.10E−10 | 9.10E−10 | 9.10E−10 |
| microgram metallocene/g 1-C10 | 33.7 | 33.7 | 52.6 | 52.6 | 52.6 | 52.6 |
| Run Time, hrs | 2 | 1 | 1 | 1 | 1 | na |
| % Conversion | 73.9 | 81.4 | 85.8 | 94.6 | 98.5 | na |
| % Lube Selectivity | 95.1 | 97.1 | 94.3 | 96.5 | 93.1 | 89.0 |
| Hydrogenated Lube Property | | | | | | |
| KV@100° C., cSt | 295.206 | 169.073 | 79.489 | 26.543 | 14.89 | 11.198 |
| KV@40° C., cSt | 3002.31 | 1617.989 | 696.789 | 197.18 | 99.737 | 70.364 |
| VI | 249 | 225 | 197 | 169 | 155 | 150 |
| PP | −30 | −30 | −33 | −48 | | −57 |
| Molecular Wt by GPC | | | | | | |
| Mn | 6103 | 4537 | 3182 | 1964 | 1516 | 1309 |
| Mw | 10732 | 7579 | 4823 | 2586 | 1760 | 1493 |
| MWD | 1.758 | 1.671 | 1.516 | 1.317 | 1.161 | 1.140 |

Two of the polyolefin samples, Example 1 and 2, made in this CSTR reactor and metallocene catalyst were compared to two Comparative Example 1 and 2 fluids prepared according to procedures reported in U.S. Pat. No. 4,827,064, which is mostly batch or semi-batch operation. They have comparable 100° C. viscosities, VI and pour points, but with broader molecular weight distribution.

When these examples were subjected to standard TRB shear stability test, Example 1 and 2 fluids had no or little viscosity change. In contrast the Comparative fluids with broad MWD and made by non-CSTR process, had high amount of viscosity loss.

TABLE 2

Shear Stability Comparison

|  | Example 1 | Comparative Example 1 | Example 2 | Comparative Example 2 |
|---|---|---|---|---|
| KV@100° C., cSt | 295.206 | 300 | 169.073 | 150 |
| KV@40° C., cSt | 3002.31 | 3100 | 1617.989 | 1500 |
| VI | 249 | 241 | 225 | 218 |
| PP | −30 | −27 | −30 | −33 |
| Molecular Wt by GPC |  |  |  |  |
| Mn | 6103 | 12911 | 4537 | 8546 |
| Mw | 10732 | 5091 | 7579 | 3758 |
| MWD | 1.758 | 2.536 | 1.671 | 2.388 |
| % TRB shear viscosity loss | 0.77 | 18.70 | 0.22 | 9.35 |

Comparative Example 3 to 6

Comparative Example 3 to 6. In this set of experiments, the polymerization was carried out in a batch mode. 50 gram of purified 1-decene was charged into a reactor under $N_2$ atmosphere and heated to reaction temperature. Then a catalyst solution containing 0.912 milligram (mg) metallocene rac-dimethylsilylbis(tetra-hydroindenyl)zirconium dichloride, 0.801 mg activator N,N-dimethylanilinium tetra(perfluorophenyl)borate and 63.6 mg of tri-isobutylaluminum dissolved in 5 ml purified toluene was added while maintaining the reaction temperature within ±2° C. of set temperature. The reaction was allowed to go for 16 hours and then water was added to deactivate the catalyst and washed to remove any catalyst residual. The remaining organic layer was then distilled to remove light solvent or unreacted starting material or 1-decene dimer. The properties of the residual lube fraction were summarized in Table 3. As these data demonstrated that the molecular weight of the fluids prepared by batch mode is always broader than the fluids prepared in CSTR mode of operation.

TABLE 3

Batch Mode Processing

|  | Comparative Example | | | |
|---|---|---|---|---|
|  | 3 | 4 | 5 | 6 |
| Temperature, ° C. | 35 | 65 | 70 | 70 |
| microgram metallocene/g 1-C10 | 18.24 | 18.24 | 9.12 | 19.08 |
| Wt % Conversion | 68.0 | 94.9 | 93.0 | 91.8 |
| Wt % Lube Selectivity | 95.7 | 97.0 | 99.2 | 96.2 |
| Lube Properties |  |  |  |  |
| V100° C., cSt | 1095.24 | 194.61 | 115.66 | 72.53 |
| V40° C., cSt | 12502 | 1848.26 | 996.27 | 606.46 |
| VI | 310 | 226 | 211 | 191 |
| Pour Point, ° C. |  | −28 | −32 | −38 |
| Mn | 12287 | 4458 | 3300 | 2909 |
| Mw | 25151 | 9094 | 6650 | 4718 |
| MWD | 2.05 | 2.04 | 2.02 | 1.62 |

EXAMPLE 7

Example 7. Similar to Examples 1 to 6, except a mixed alpha-olefins containing 33 wt % 1-hexene and 67 wt % 1-dodecene and reaction temperature was maintained at 55° C. The resulting product has the following properties: 100° C. KV=185.1 cSt; 40° C. KV=2106 cSt; VI=210; Pour Point=−30° C.; Mn=4583; Mw=7864; MWD=1.716.

Examples 1 to 7 demonstrate that coupling CSTR processing with metallocene catalysts produces products with very narrow MWD with significantly improved shear stability. In addition, these examples show that the improvement is not limited to pure 1-decene as feed, but also applies to wide range of mixed alpha-olefins as feed, including feeds comprising one or more of 1-hexene, 1-octene, 1-decene, 1-dodecene, 1-tetradecene and 1-hexadecene.

EXAMPLE 8

A 25/60/15 wt % mixture of C6/C10/C14 LAOs was purified using 3 A mole sieves under 30 psig nitrogen pressure and then was fed to the CSTR equipment while maintaining the same nitrogen pressure. Continuous LAO feed was then started at a rate of about 500 lb/hr during CSTR operation. The water content of LAO coming out of the mole sieve bed and entering the reactor was about 5 ppm. The residence time of LAO in the mole sieve bed was about 4 hours.

Feed purification: the mixed LAO feed was purified before the reactor via commercial, pre-activated 3 A mole sieves. The sieves were loaded in the feed purification vessel under nitrogen. The mole sieve bed was first filled up with the LAO feed mixture in a batch mode. This operation was monitored closely for any exotherm in the mole sieve bed. No exotherm was observed. Continuous LAO feed was then started at a rate of about 500 lb/hr during CSTR operation. The water content of LAO coming out of the mole sieve bed and entering the reactor was about 5 ppm. The residence time of LAO in the mole sieve bed was about 4 hours.

The metallocene catalyst used was rac-dimethyl-silyl-bis [4,5,6,7-tetrahydroindenyl]zirconium dichloride, the activator used was N,N-dimethylanilinium tetrakis(penta-fluorophenyl)borate. Tri-n-octylaluminum (TNOA) was used as co-activator.

All three catalyst components were supplied in double-valved pressurized cylinders as solutions in toluene. The concentration of catalyst components was as follows:

| metallocene: | 1% in toluene |
|---|---|
| activator: | 0.1% in toluene |
| co-activator: | 25% in toluene |

A constant nitrogen pressure of about 15 psi was maintained on the cylinders and the catalyst components were metered into the reactor via rotameters using tubing providing about 5 minutes of residence time. The molar ratio of the three catalyst components metallocene/activator/co-activator was 1:1:10.

The typical concentration (neat) of the catalyst components in the reactor was:

| metallocene: | 10 ppm |
|---|---|
| activator | 19 ppm |
| Co-activator: | 80 ppm |

The reactor, purged with nitrogen for several hours beforehand, was purged with toluene having a moisture content of about 1000 ppm and then flushed three times with mole sieve dried LAO feed (having less than 5 ppm water). After establishing that the water content in the LAO from the reactor tested less than 10 ppm water, the reactor and LAO were considered clean and dry and ready for start of the reaction step.

After preparation of the initial reaction heel, flow rates of LAO, Catalyst components, and TNOA as scavenger were started for CSTR operation. The residence time during the run was 3 hours and was maintained by controlling the total weight control of the reactor. The working volume in the reactor was 200 gallons.

Reactor temperature set point was 140° F. (60° C.). The flow of cooling water on the heat exchanger was adjusted so that temperature fluctuated by ±2° F. from the desired 140° F. set point during CSTR operation. Conversion in the reactor was monitored via refractive index measurement. The average conversion during the run was about 77%. The reaction effluent sample was distilled in the laboratory to determine its viscosity. Small adjustments in reactor temperature around the 140° F. set point were made to get to the desired 150 cSt viscosity. The polymerized mPAO crude was first collected in totes and the samples from each tote were distilled to determine product viscosity before transferring the totes to a tank truck.

During the reaction, aliquots may be taken an tested as "totes". During this operation, the distilled viscosity from every tote was found to be within ±10 cSt of the target of 150 cSt; most of the totes had viscosities within ±5 cSt of the target. The robust viscosity control of the metallocene process was clearly demonstrated during the run.

Reaction Quench

The polymerized mPAO crude from the reactor was quenched by adding water and mixing.

CSTR Shutdown

The reaction in the CSTR was stopped by stopping the feed and then adding water to the reactor and mixing. The viscosity of this final reactor drain material was within the 150 cSt specification.

Catalyst Filtration

The catalyst in the quenched reaction mass was filtered via two sets of cartridge filters commercially available from Cuno (10 micron absolute) made of Cellulose Glass with a Melamine resin per se known in the art.

Distillation of Crude Product from CSTR

The composition of crude product obtained after separation from the quenched catalyst was:

| Component | % by GC |
|---|---|
| Hexene | 5.0 |
| Toluene | 2.0 |
| Decene | 13.9 |
| Tetradecene | 3.5 |
| C18-24 Dimers | 0.5 |
| mPAO Product | 75.1 |

This crude was distilled in a single stage Thin Film Evaporator (TFE). The ordinary artisan can select the appropriate TFE from commercially available apparatus. Typical processing conditions during the TFE were:

| Pressure: | 10 mmHg |
|---|---|
| Bulk temperature: | 490° F. |
| Hot Oil temperature: | 540° F. |

Under these process conditions, total residual monomer, solvent and dimer were less than 1.0%. GC indicated no sign of cracking or thermal degradation under these thin film evaporator conditions of temperature and pressure.

Although a single-stage TFE was used in this experiment, a two stage continuous flash Thin Film Evaporation is preferred mode of distillation. This will minimize any issues with product cracking and also reduce/eliminate emission of light ends.

Hydrogenation 150 cSt mPAO was hydrogenated in a fixed bed hydrogenation unit. Typical hydrogenation temperature was about 350° F. and pressure was about 250 psig. The flow rate during hydrogenation was 1 GPM and bromine number of ~1.0 was achieved.

Polish Filtration

Final filtration of hydrogenated mPAO is necessary to reduce the particle count, particularly for >4 micron particles (mean diameter). Polish filtration involved a combination of Sparkler™ filter (commercially available from Sparkler Filters, Inc.) with diatomaceous earth impregnated filter paper and about 2 micron absolute bag filters.

Anti-Oxidant Addition 150 ppm Irganox L-57 was added to the filtered mPAO.

Characterization of Final Product

Selected characteristics of the final mPAO product are listed below:

| Pour Point | −39 C. |
|---|---|
| 100 C. Viscosity | 158 cSt |
| 40 C. Viscosity | 1729 cSt |
| VI | 204 |

Applications

The lubricating oils or grease of the present invention are particularly preferred to be used for the lubrication of rolling element bearings (e.g., ball bearings), gears, circulation lubrication system, hydraulics, compressors used to compress gas (such as reciprocating, rotary and turbo-type air compressors, gas turbine or other process gas compressors) or to compress liquids (such as refrigerator compressors), vacuum pump or metal working machinery, as well as electrical applications, such as for lubrication of electrical switch that produces an electrical arc during on-off cycling or for electrical connectors.

The lubricant or grease components disclosed in this invention are most suitable for applications in industrial machinery where one of more the following characteristics are desirable: wide temperature range, stable and reliable operation, superior protection, extended operation period, energy efficient. The present oils are characterized by an excellent balance of performance properties including superior high and low temperature viscosities, flowability, excellent foam property, shear stability, and improved anti-wear characteristics, thermal and oxidative stability, low friction, low traction. They may find utility as gear oils, bearing oil, circulating oils, compressor oils, hydraulic oils, turbine oils, grease for all kinds of machinery, as well as in other applications, for example, in wet clutch systems, blower bearings, wind turbine gear box, coal pulverizer drives, cooling tower gearboxes, kiln drives, paper machine drives and rotary screw compressors.

Kinematic Viscosity (KV) was measured according to ASTM D445 at the temperature indicated (e.g., 100° C. or −40° C.).

Viscosity Index (VI) was determined according to ASTM D-2270.

Noack volatility was determined according to the ASTM D5800 method, with the exception that the thermometer calibration is performed annually rather than biannually.

Pour point was determined according to ASTM D5950.

Oligomer distribution was determined by using the Hewlett Packard (HP) 5890 Series II Plus GC, equipped with flame ionization detector (FID) and capillary column.

Unless stated otherwise herein, the meanings of terms used herein shall take their ordinary meaning in the art; and reference shall be taken, in particular, to Synthetic Lubricants and High-Performance Functional Fluids, Second Edition, Edited by Leslie R. Rudnick and Ronald L. Shubkin, Marcel Dekker (1999). This reference, as well as all patents and patent applications, test procedures (such as ASTM methods and the like), and other documents cited herein are fully incorporated by reference to the extent such disclosure is not inconsistent with this invention and for all jurisdictions in which such incorporation is permitted. Note that Trade Names used herein are indicated by a ™ symbol or ® symbol, indicating that the names may be protected by certain trademark rights, e.g., they may be registered trademarks in various jurisdictions. Note also that when numerical lower limits and numerical upper limits are listed herein, ranges from any lower limit to any upper limit are contemplated.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein.

What is claimed is:

1. A process for preparing a high viscosity PAO base stock, comprising contacting a catalyst system comprising a single-site metallocene and a non-coordinating anion (NCA) with a feedstock consisting of linear alpha-olefins and optionally water at a concentration of less than 10 ppm by weight in a continuous stirred tank reactor (CSTR) operation to obtain a PAO crude product, wherein said feedstock is selected from the group consisting of:
   (i) a mixed feedstock consisting essentially of C10 and C12 alpha-olefins comprising from about 1 wt % to 90 wt % of 1-decene; (ii) a mixed feedstock consisting essentially of C12 to C14 alpha-olefins; (iii) a mixed feedstock consisting essentially of C6, C10, and C14 alpha-olefins comprising from about 1 wt % to 90 wt % of 1-decene; and (iv) a mixed feedstock consisting essentially of C6, C10, C12, and C14 alpha-olefins comprising from about 1 wt % to 90 wt % of 1-decene, and
   obtaining a high viscosity PAO base stock from the PAO crude product; wherein the high viscosity PAO base stock is characterized by a $KV_{100}$ of greater than 10 to about 10,000 cSt, and a MWD of 1.76 or less, where $KV_{100}$ is kinematic viscosity measured at 100° C. in cSt.

2. The process according to claim 1, wherein obtaining the high viscosity PAO base stock from the crude product includes a step of hydrogenating the PAO crude product.

3. The process according to claim 1, wherein the PAO crude product comprises particles having a mean diameter of >4 microns and at least one of Al, Zr, Si, and B, and the step of obtaining the high viscosity PAO base stock includes a step of filtering the PAO crude product and the high viscosity PAO base stock comprises less than 1000 ppm by weight of the particles having a mean diameter of >4 microns and less than 1 ppm by weight of said at least one of Al, Zr, Si, and B.

4. The process according to claim 1, wherein the high viscosity PAO base stock is characterized by a $KV_{100}$ of greater than 10 to about 300 cSt, a MWD of 1.76 or less, and a Viscosity Index of 195-220.

5. The process according to claim 1, wherein the high viscosity PAO base stock is characterized by a $KV_{100}$ of about 20 to about 250 cSt, and a MWD of 1.76 or less.

6. The process according to claim 1, wherein the high viscosity PAO base stock is characterized by a $KV_{100}$ of about 90 to about 160 cSt, and a MWD of 1.76 or less.

7. The process according to claim 1, wherein the high viscosity PAO base stock is characterized by a $KV_{100}$ of about 250 to about 900 cSt, and a MWD of 1.76 or less.

8. The process according to claim 1, wherein the high viscosity PAO base stock is characterized by a $KV_{100}$ of about 300 to about 650 cSt, and a MWD of 1.76 or less.

9. The process according to claim 1, including:
   (a) a step of drying an olefin feedstock precursor over molecular sieves to obtain the feedstock wherein the feedstock has a water content of less than 10 ppm by weight;
   (b) contacting the feedstock from step (a) with the catalyst system, wherein the catalyst system further comprises a trialkyl aluminum co-activator and the PAO crude product further comprises particles having a mean diameter of >4 microns and at least one of Al, Zr, Si, and B, wherein the step of obtaining the high viscosity PAO base stock includes:
   (c) separating said PAO crude product from step (b) from said catalyst system;
   (d) distilling said PAO crude product to obtain a crude lubricant range PAO;
   (e) filtering said crude lubricant range PAO to obtain the high viscosity PAO base stock, wherein the high viscosity PAO base stock comprises less than 1000 ppm of the particles having a mean diameter of >4 microns and less than 1 ppm by weight of said at least one of Al, Zr, Si, and B.

10. The process according to claim 1, wherein the high viscosity PAO base stock is characterized by a MWD that is at least 10 percent less than MWD=0.41667+[0.725*log $KV_{100}$].

11. A lubricant comprising a high viscosity PAO base stock made by the process of claim 1, wherein the lubricant is a gear oil, bearing oil, circulating oil, compressor oil, hydraulic oil, turbine oil, or machinery grease.

12. The process according to claim 1, wherein the high viscosity PAO base stock is characterized by a MWD that is at least 10 percent less than MWD=0.66017+[0.44922*log $KV_{100}$].

13. The process according to claim 2, wherein after hydrogenation, the high viscosity PAO base stock has a bromine number below 1.

* * * * *